(12) United States Patent
Lionetti et al.

(10) Patent No.: US 7,029,137 B2
(45) Date of Patent: Apr. 18, 2006

(54) CABLE HAVING AN ILLUMINATING TRACER ELEMENT MOUNTED THEREON

(75) Inventors: Christopher L. Lionetti, Round Rock, TX (US); Barbara L. Meier, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 10/365,776

(22) Filed: Feb. 13, 2003

(65) Prior Publication Data

US 2004/0160774 A1     Aug. 19, 2004

(51) Int. Cl.
*F21V 9/16* (2006.01)

(52) U.S. Cl. .................. 362/84; 362/800; 362/253; 362/34; 362/391

(58) Field of Classification Search ............... 362/84, 362/205, 34, 391, 800, 253; 439/353, 352, 439/488, 490; 200/314, 317, 310, 308; 174/36, 174/110 R, 113 R
See application file for complete search history.

(56) References Cited

U.S. PATENT DOCUMENTS

| | | | | |
|---|---|---|---|---|
| 3,420,381 A | * | 1/1969 | Bradfield | 211/26 |
| 3,960,428 A | * | 6/1976 | Naus et al. | 439/315 |
| 4,072,398 A | * | 2/1978 | Larsen et al. | 385/112 |
| 4,761,720 A | * | 8/1988 | Solow | 362/252 |
| 5,437,811 A | | 8/1995 | Doane et al. | |
| 5,477,427 A | * | 12/1995 | Forman | 362/473 |
| 5,668,614 A | | 9/1997 | Chien et al. | |
| 5,691,795 A | | 11/1997 | Doane et al. | |
| 5,695,682 A | | 12/1997 | Doane et al. | |
| 5,769,527 A | * | 6/1998 | Taylor et al. | 362/85 |
| 6,104,448 A | | 8/2000 | Doane et al. | |
| 6,257,750 B1 | * | 7/2001 | Strasser et al. | 362/559 |
| 6,544,078 B1 | * | 4/2003 | Palmisano et al. | 439/762 |
| 2002/0030990 A1 | * | 3/2002 | Wang | 362/219 |

FOREIGN PATENT DOCUMENTS

| | | | |
|---|---|---|---|
| DE | 29822110 U1 | * | 3/1999 |
| EP | 089884 A1 | * | 3/1998 |
| JP | 2000123644 A | * | 4/2000 |

* cited by examiner

*Primary Examiner*—Sandra O'Shea
*Assistant Examiner*—Sharon Payne
(74) *Attorney, Agent, or Firm*—Haynes and Boone, LLP

(57) ABSTRACT

A plurality of cables interconnect a plurality of components. Each cable has a first terminal end and a second terminal end. A respective light emitting member extends on each cable between the first and second terminal ends. The light emitting member on a respective cable is illuminated in response to manipulation of the light emitting member. The cable is then traceable from end to end.

14 Claims, 7 Drawing Sheets

CABLE HAVING AN ILLUMINATING TRACER ELEMENT MOUNTED THEREON

BACKGROUND

The present disclosure relates generally to information handling systems, and more particularly to tracing cables used in such systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The present disclosure relates to connective cables, wires, pipes, flat ribbon cables, or tubes (hereinafter called cables), currently used to transmit an element such as energy, sound, light, liquids, gases, and/or data for purposes of power, audio, voice, communications, water, chemicals, or information transmission or distribution. More specifically, this disclosure describes tracing cables that allow users to visually follow the path from start to finish of a single cable placed in an obscure physical location or to distinguish one among multiple cables in a group.

In environments supporting increasing numbers of users, the need for more connective cables likewise grows. Whether the cabling system is designed to provide water or electric power to an office complex or to connect telephone systems, computer or storage networks, audio/video or animation control systems, or other element transmissions, the cabling system must be maintained to resolve any point of failure quickly and efficiently.

In existing cable designs, the only mechanism for individual cable identification is color-coding which can be difficult to use when more than one cable has the same color exterior sheath. Further, color-coded cables do not address the needs of users who have difficulty distinguishing one color from another. For this reason, a cable tracing solution is needed that produces a visual state change with user-controlled illumination along the length of a selected cable.

Because cabling needs vary greatly based on the specific installation, these cable systems are uniquely custom installed and maintained. If, for example, a cable system connects telephones or electric throughout an office building, a large number of wires are routed under the floor or above the ceiling. These cables run back to meet at electrical switch boxes, patch boards, or other control devices. These control devices are designed to route the voice signal or electrical power where it is needed, often at a great distance from the origin. As the cables converge, they are either run separately at random or tied together into increasingly large bundles. In either case, it can be nearly impossible to identify a single cable's start and end point simultaneously, due to their distance of separation.

Even if a cable's start and end point is in close proximity, it can still be difficult for a user to trace a single cable. For instance, this often happens with cabling systems providing the pathways for data transmission among computer or storage network devices stacked in one or more adjacent computer racks. In this type of cable installation, the sheer number of cable connecting devices can easily result in a disarray of unidentifiable cables, or thick bundles with some cables nearly hidden by others.

If one of the cables or connected devices in a cabling system experiences a compromise or interruption of the intended element flow, it must be located and corrected by human intervention. Almost always, this must happen as quickly as possible. If a cabling system supports a data network, the cost of that cabling system failing can mean very large revenue losses per second at large financial institutions. In many cabling systems, cabling failures can not be tolerated.

A remotely related method of tracing cables is to physically label both ends of every cable, which is time consuming and does not identify the entire cable length, only its end connectors. A very different technique is used when burying fiber optic cables underground. In that situation, the fiber optic cables could not be relocated easily after they have been buried because they are comprised of glass, insulating material, and an outer polymer sheath. To solve that problem, a metal wire (commonly described as a "tracer cable") is run parallel to, and just above, the fiber optic cable to allow metal detector equipment to locate these buried cables. Such a solution only solves the problem of buried fiber optic cables, but not the problem of tracing cables of multiple types and purposes located inside buildings due to the large amount of metal used for building purposes. It also does not solve the problem of cables run outside above ground, such as electrical cable, or telephone cables that are attached to tall poles.

At present, there is no known device or method which provides for identifying and tracing a cable by manipulating the cable length and being able to trace the entire length of that cable.

SUMMARY

One embodiment, accordingly, provides a cable tracer including a cable having a first terminal end and a second terminal end. A light emitting member extends on the cable between the first and second terminal ends.

A principal advantage of this embodiment is that any cable can be manipulated to actuate the light emitting member and illuminate the cable.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
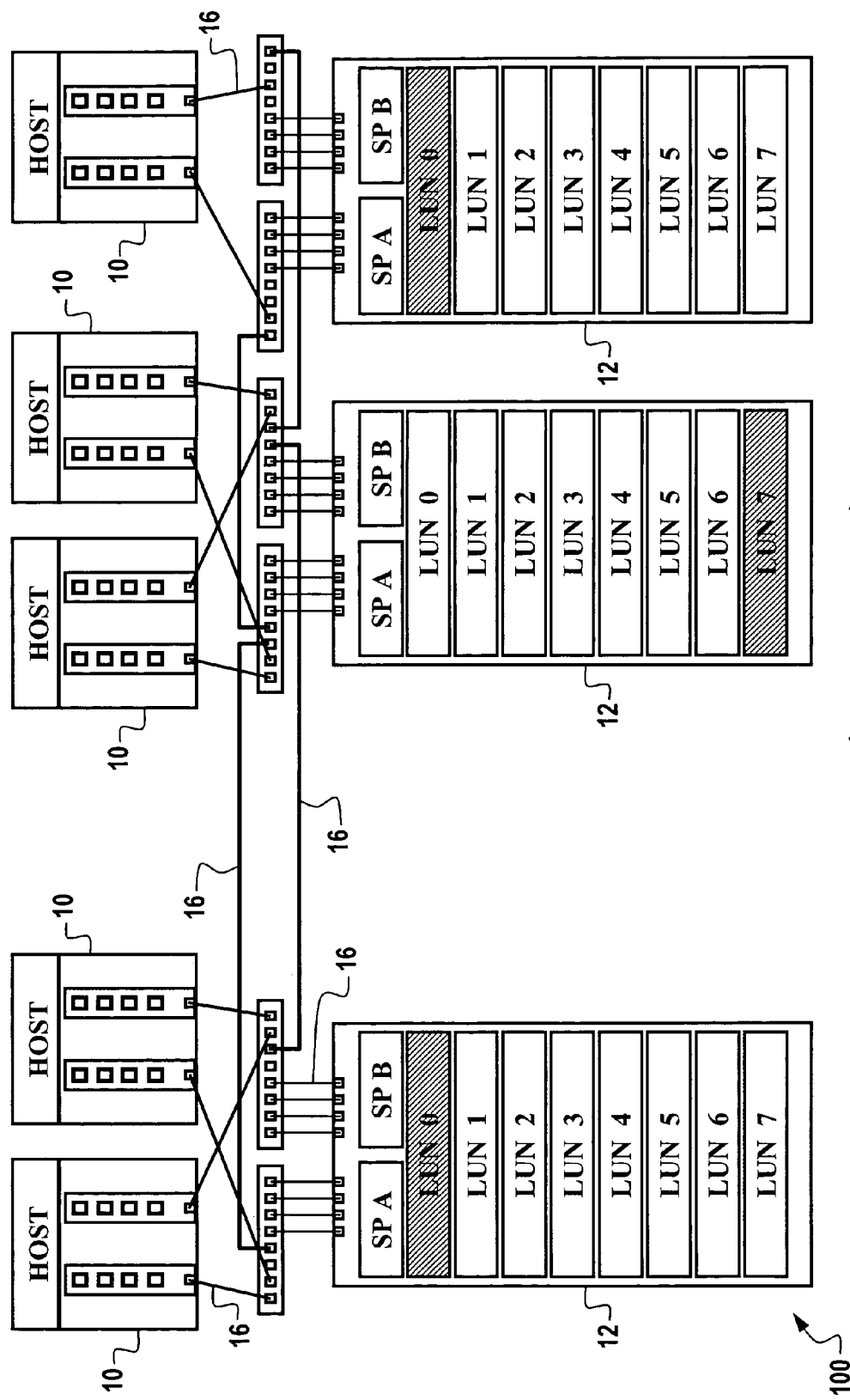
FIGS. 1–3 are views illustrating an embodiment of a network system.
Figure 2:
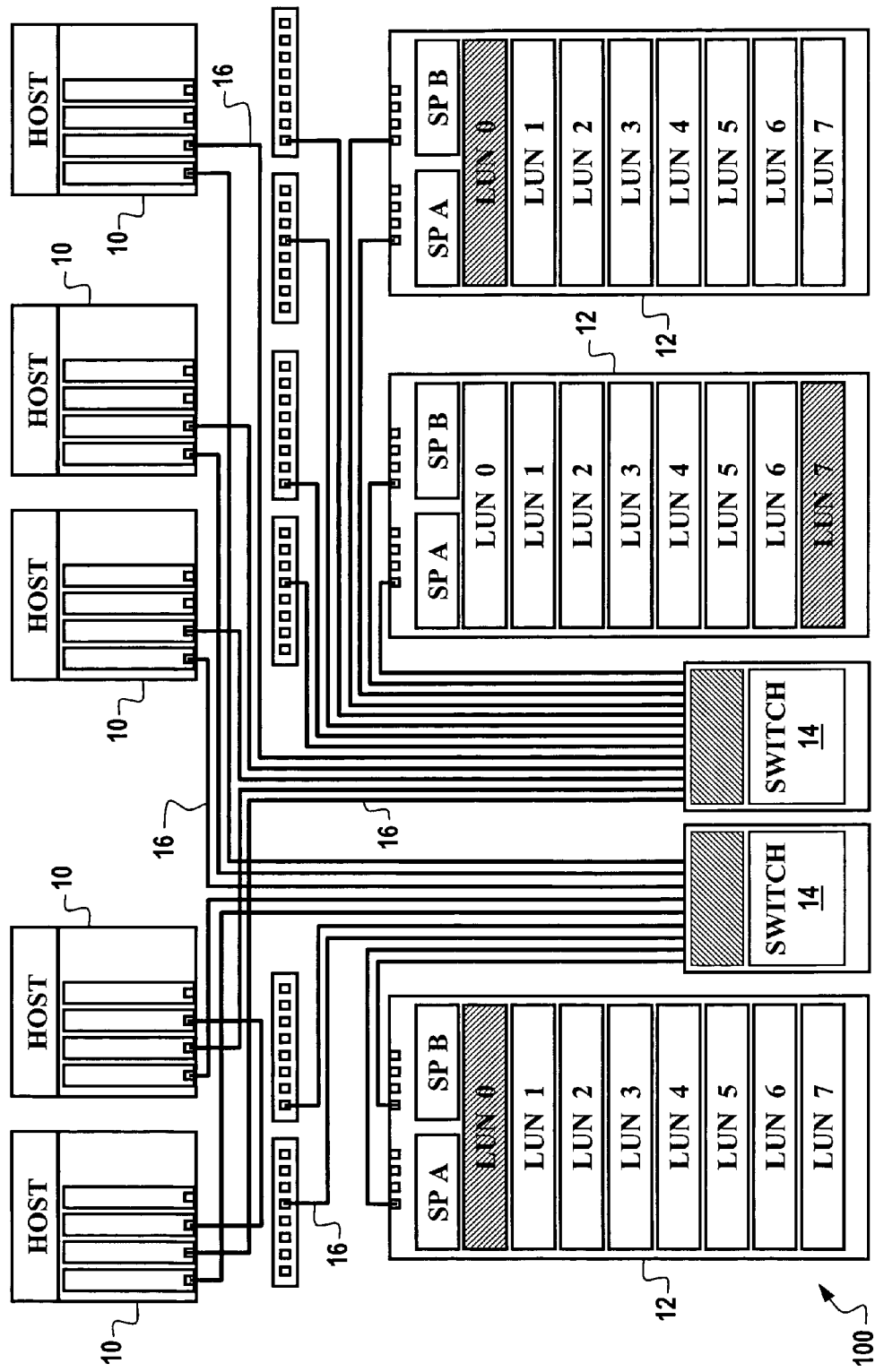
Figure 3:
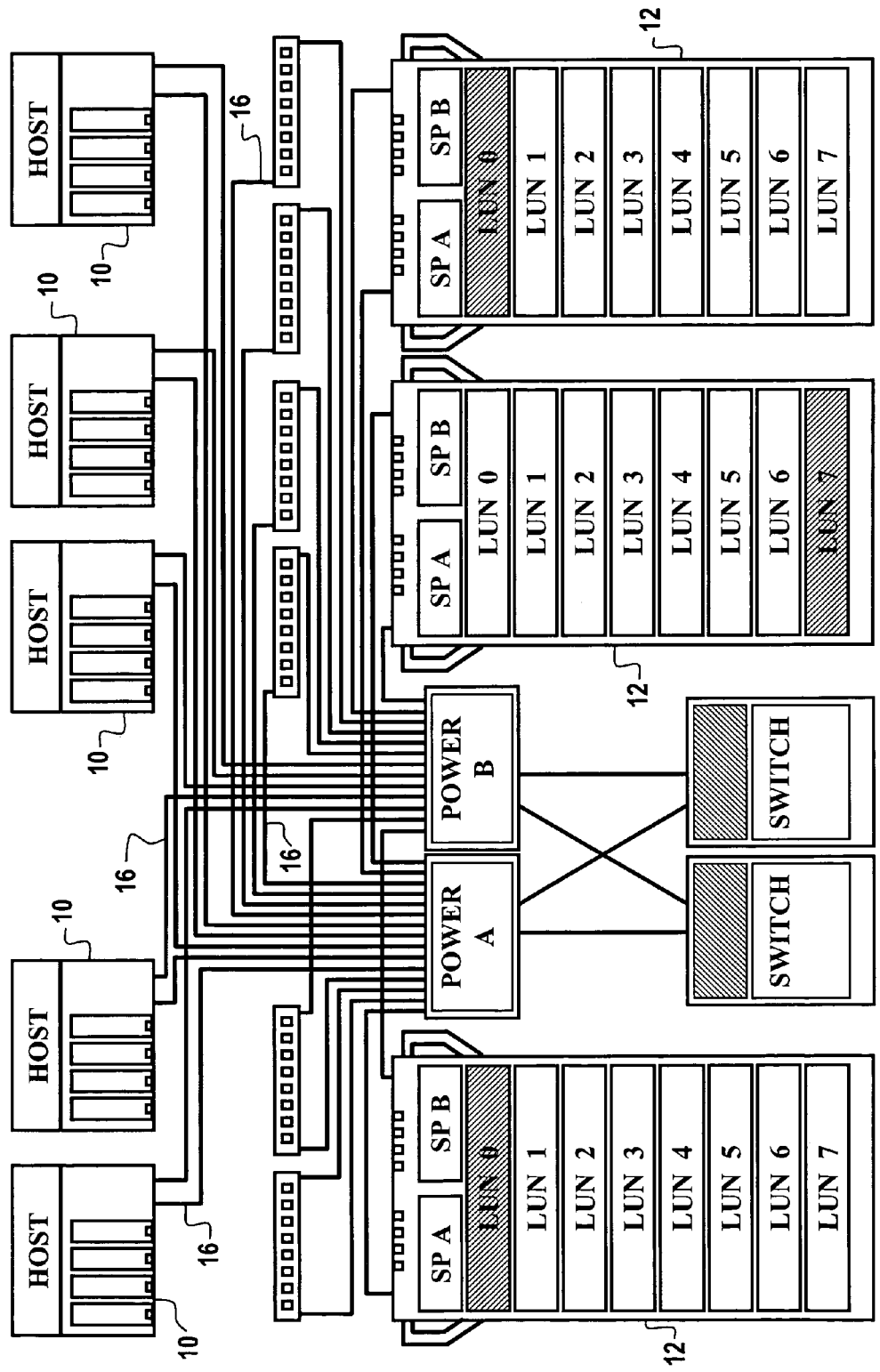

FIGS. 1–3 illustrate an embodiment of a simple storage area network (SAN) 100 having five host servers 10, including storage and processors, and three arrays 12 also connected to switches 14. This illustrates how a substantial number of cables 16 exist in a single installation. The cables 16 may be individual cables or may be a bundle of cables, described below. Some of the cables 16, FIG. 2, are optical cables, which however, are indistinguishable from SAN cables in the same network, as are power cables and Ethernet cables. The SAN 100 also includes cables 16 which are power cables. Thus, the problem of identifying and tracing cables is apparent.

Figure 4:
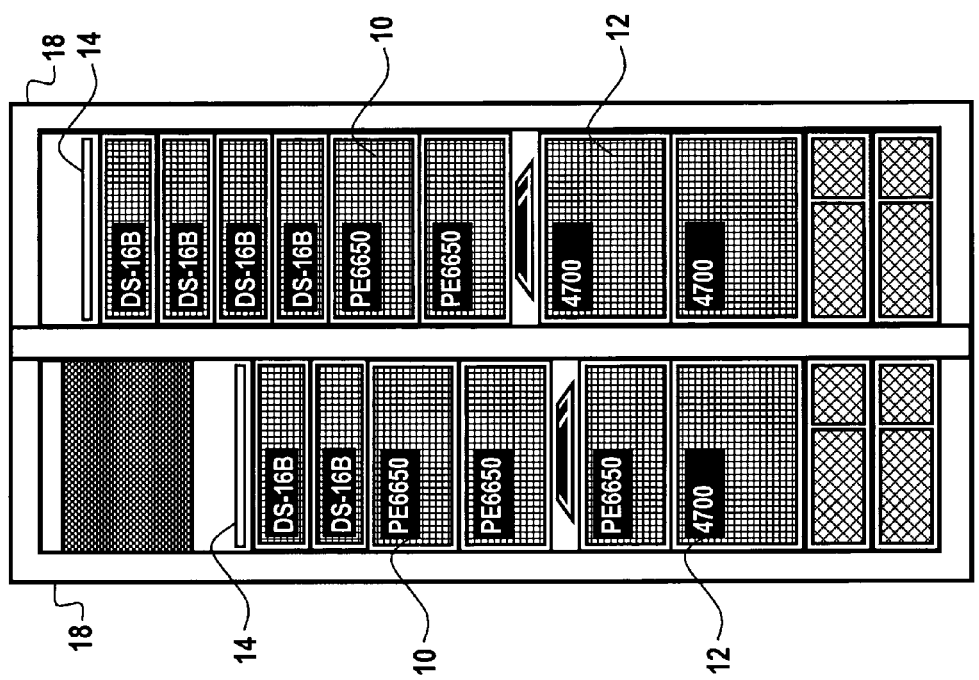
FIGS. 4 and 5 are views illustrating an embodiment of racks interconnected by cables.
Figure 5:
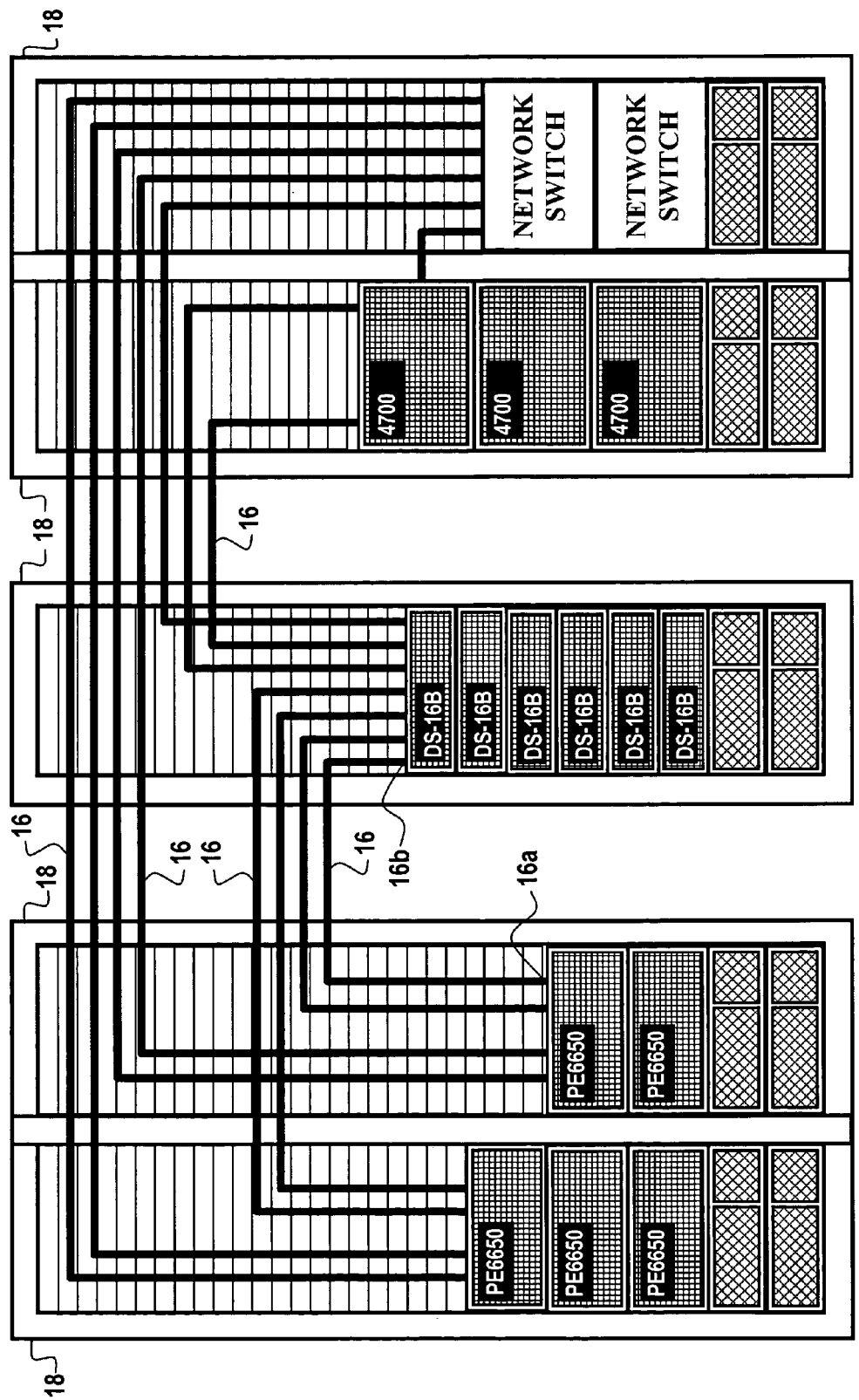

FIG. 4 illustrates a pair of side-by-side racks 18 as viewed from the front, including switches 14, arrays 12 and servers 10. However, as FIG. 5 illustrates, racks 18 could be spaced apart by several feet, thus compounding the identification and tracing of cables 16 at the rear of racks 18. Each cable 16 has terminal ends 16a and 16b.

Figure 6:
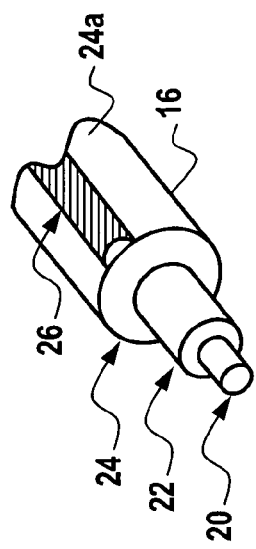
FIGS. 6 and 7 are perspective views illustrating embodiments of an illuminating element extending along a cable.

A section of a cable 16 is illustrated in FIG. 6, and includes a core 20, a ground 22, a sheath 24 and an illuminating member 26 which extends along the length of the cable 16 between the terminal ends, 16a, 16b, see also FIG. 5. The illuminating member 26 is imbedded in the sheath 24.

Figure 7:
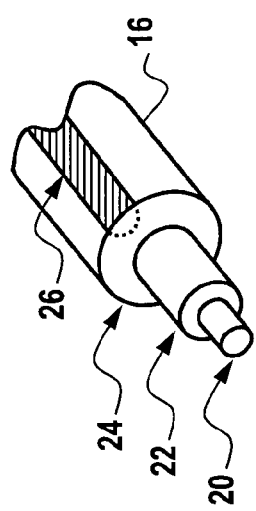

A section of cable 16 is illustrated in FIG. 7, and includes a core 20, a ground 22, a sheath 24 and an illuminating member 26 which extends along the length of cable 16 between the terminal ends 16a, 16b, see also FIG. 5. The illuminating member 26 is mounted on an outer surface 24a of sheath 24.

Figure 8:
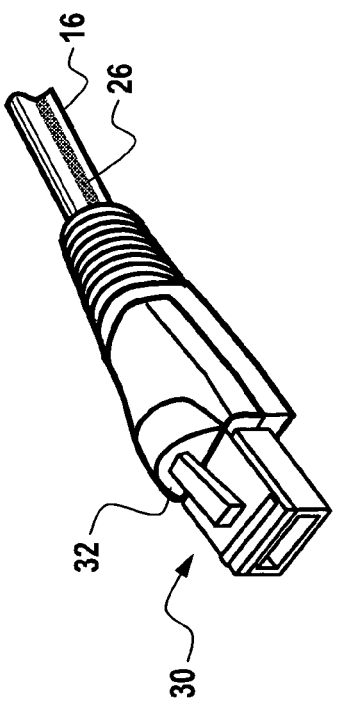
FIG. 8 is a perspective view illustrating an embodiment of a cable including a connector lock release tab for manipulation to activate the illuminating element.

A connector lock release tab is designated 30 in FIG. 8. Each terminal end of cable 16 includes a tab 30. The cable 16 includes the illuminating member 26 which is activated by pressing down on an activator 32 positioned on the tab 30. As a result, the illuminating member 26 is illuminated and the entire length of cable 16 is traceable from end to end.

Figure 9:
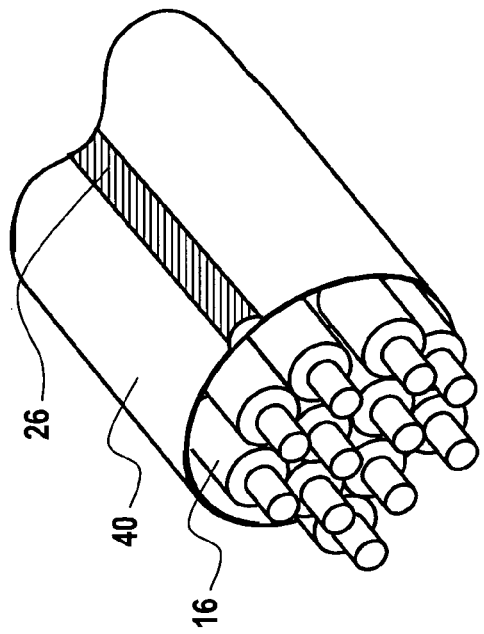
FIG. 9 is a perspective view illustrating an embodiment of a plurality of cables bundled in a sleeve.

A plurality of cables 16 may be routed in a bundle configuration, FIG. 9. A sleeve 40 is provided to retain cables 16 in a bundle which extends from a connection at a first component to a connection at a second component. The sleeve 40 may be provided with the illuminating member 26 which extends along the length of the bundle, rather than providing each individual cable 16 within the sleeve 40 with an illuminating member 26. Also, a connector tab may be provided at terminal ends of each cable in the bundle.

An example of an illuminating member which may be used is a commercially available product such as Multi-Purpose Flexible PathLed™ LED light strip available from Ledtronics, Inc., Torrance, Calif. A power source 42, FIG. 10, may be attached to illuminating member 26 on cable 16. Pressure applied to the activator 32, see also FIG. 8, closes a circuit which permits power from power source 42 to illuminate member 26.

Figure 11:
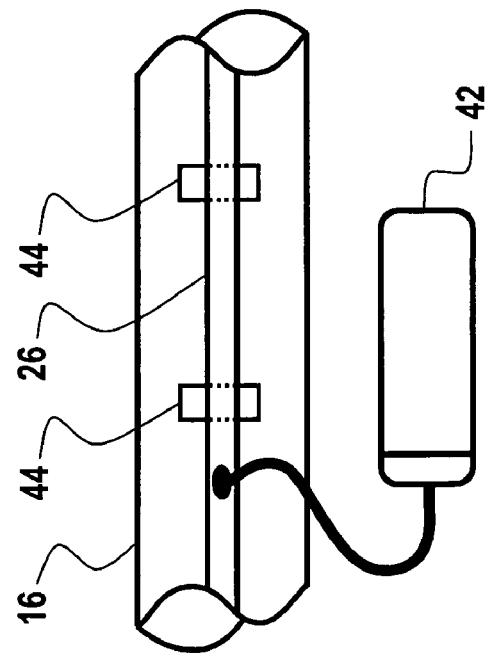
FIG. 11 is a diagrammatic view illustrating pressure members for activating the illuminating element.
Figure 10:
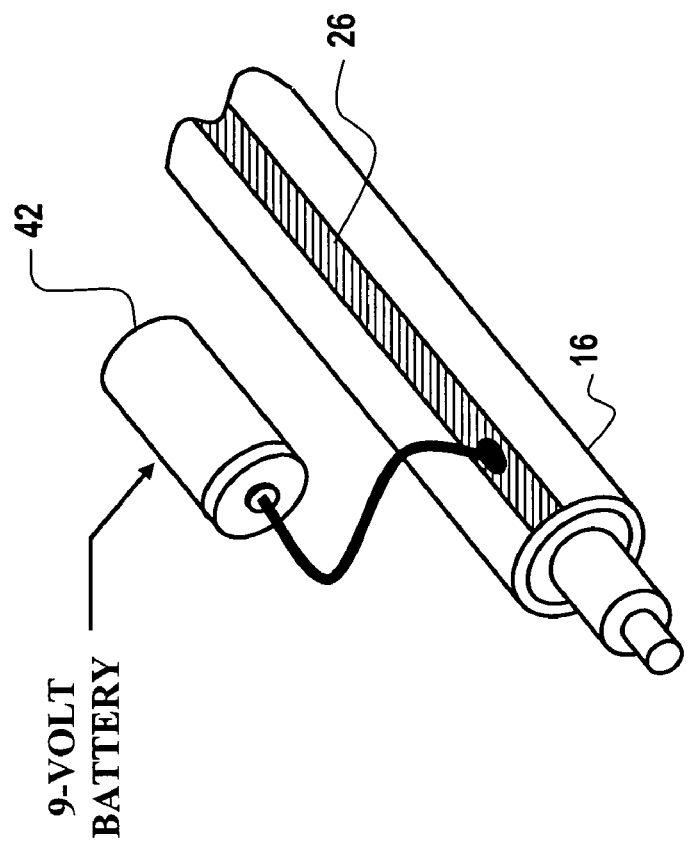
FIG. 10 is a view illustrating of an embodiment of a power source for the illuminating element.

In addition, as illustrated in FIGS. 10 and 11, power source 42 is attached to illuminating member 26 on cable 16. One or more vampire clips 44 may be provided along the length of cable 16 so that pressure applied to any one of the clips 44 will close a circuit permitting power from source 42 to illuminate member 26.

It is also possible that chemically activated illuminating strips, responsive to pressure, can be used in place of an illuminating strip with a power source.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable tracer apparatus comprising:
   a plurality of component racks;
   a plurality of components on each rack;
   a plurality of cables interconnecting the components;
   each cable having a first terminal end and a second terminal end;
   a continuous means for emitting an elongated strip of uninterrupted light extending on the cable between the first and second terminal ends;
   activator means coupled to provide power to illuminate the uninterrupted light strip; and
   connector lock release tabs provided at the terminal ends of the cable, whereby the light emitting member is activated by manipulation of the tabs.

2. The apparatus as defined in claim 1 wherein the light emitting member is mounted within a sheath portion of the cable.

3. The apparatus as defined in claim 1 wherein the light emitting member is mounted on an outer sheath portion of the cable.

4. An information handling system comprising:
   a plurality of racks;
   a component on each rack;
   a plurality of cables interconnecting the components;
   a microprocessor mounted in one of the components;
   a storage device coupled to the microprocessor;
   each cable having a first terminal end and a second terminal end;
   a continuous means for emitting an elongated strip of uninterrupted light extending on each cable between the first and second terminal ends;

activator means coupled to provide power to illuminate the uninterrupted light strip; and connector lock release tabs provided at the terminal ends of the cable, whereby the light emitting member is activated by manipulation of the tabs.

5. The system as defined in claim 4 wherein the light emitting member is mounted within a sheath portion of the cable.

6. The system as defined in claim 4 wherein the light emitting member is mounted on an outer sheath portion of the cable.

7. A method of providing a traceable cable comprising:
mounting a plurality of components on a plurality of racks;
extending cables between the components;
extending a continuous means for emitting an elongated strip of uninterrupted light on the cable between the first and second components;
coupling an activator means to provide power to illuminate the uninterrupted light strip; and
providing connector lock release tabs at terminal ends of the cable, whereby the light emitting member is activated by manipulation of the tabs.

8. The method as defined in claim 7 wherein the light emitting member is mounted within a sheath portion of the cable.

9. The method as defined in claim 7 wherein the light emitting member is mounted on an outer sheath portion of the cable.

10. An information handling system comprising:
a plurality of racks;
a plurality of components on the racks;
a plurality of cables interconnecting the components;
a sleeve incorporating the cables into a cable bundle;
a continuous means for emitting an elongated strip of uninterrupted light extending on the sleeve between the first and second components;
activator means coupled to provide power to illuminate the uninterrupted light strip; and
connector lock release tabs provided at terminal ends of the bundle, whereby the light emitting member is activated by manipulation of the tabs.

11. The system as defined in claim 10 wherein the light emitting member is mounted within the sleeve.

12. The system as defined in claim 10 wherein the light emitting member is mounted on the sleeve.

13. A cable tracer apparatus comprising:
a plurality of component racks;
a plurality of components on each rack;
a plurality of cables interconnecting the components;
each cable having a first terminal end and a second terminal end;
an elongated uninterrupted light emitting member extending between the first and second terminal ends;
activator means coupled to provide power to illuminate the elongated uninterrupted light; and
connector lock release tabs provided at the terminal ends of the cable, whereby the light emitting member is activated by manipulation of the tabs.

14. The apparatus as defined in claim 13 wherein the activator means comprises chemically activated means.

* * * * *